United States Patent
Herrmann et al.

(10) Patent No.: US 9,970,337 B2
(45) Date of Patent: May 15, 2018

(54) ACTUATOR FOR VALVES IN INTERNAL COMBUSTION ENGINES

(71) Applicant: PIERBURG GMBH, Neuss (DE)

(72) Inventors: Berthold Herrmann, Neuss (DE); Bjoern Jonas Ozdyk, Duesseldorf (DE); Holger Paffrath, Pulheim (DE); Halim Celik, Huerth (DE); Matthias Boutros-Mikhail, Neuss (DE); Kai Sassenrath, Cologne (DE)

(73) Assignee: PIERBURG GMBH, Neuss (DE)

( * ) Notice: Subject to any disclaimer, the term of this patent is extended or adjusted under 35 U.S.C. 154(b) by 12 days.

(21) Appl. No.: 15/031,276

(22) PCT Filed: Sep. 19, 2014

(86) PCT No.: PCT/EP2014/070008
§ 371 (c)(1),
(2) Date: Apr. 22, 2016

(87) PCT Pub. No.: WO2015/058914
PCT Pub. Date: Apr. 30, 2015

(65) Prior Publication Data
US 2016/0258329 A1 Sep. 8, 2016

(30) Foreign Application Priority Data

Oct. 24, 2013 (DE) .......................... 10 2013 111 722

(51) Int. Cl.
*F01L 9/04* (2006.01)
*F01N 3/22* (2006.01)
(Continued)

(52) U.S. Cl.
CPC ................ *F01L 9/04* (2013.01); *F01N 3/222* (2013.01); *F01N 3/30* (2013.01); *F02B 37/183* (2013.01);
(Continued)

(58) Field of Classification Search
CPC .................. F01L 9/04; F01L 2009/043; F01L 2009/0463; F01N 3/222; F01N 3/30; F01N 2390/02; F02B 37/183; F02M 26/53; F02M 26/54; H01F 7/1607; H01F 7/129; Y02T 10/144; Y02T 10/20
See application file for complete search history.

(56) References Cited

U.S. PATENT DOCUMENTS

| 5,240,227 A | 8/1993 | Sich |
| 2006/0038644 A1 | 2/2006 | Larimore et al. |

(Continued)

FOREIGN PATENT DOCUMENTS

| CN | 102762830 A | 10/2012 |
| DE | 98 238 A1 | 6/1973 |

(Continued)

*Primary Examiner* — Zelalem Eshete
(74) *Attorney, Agent, or Firm* — Norman B. Thot

(57) ABSTRACT

An actuator for a valve in an internal combustion engine includes a housing, an electric drive unit arranged in an interior of the housing, an aeration opening arranged in the housing, a plug configured to electrically connect the electric drive unit to a voltage source, and a membrane comprising pores. The membrane is configured to close the aeration opening in the housing.

19 Claims, 1 Drawing Sheet

(51) Int. Cl.

| | | |
|---|---|---|
| *F01N 3/30* | (2006.01) | |
| *F02B 37/18* | (2006.01) | |
| *H01F 7/129* | (2006.01) | |
| *H01F 7/16* | (2006.01) | |
| *F02M 26/53* | (2016.01) | |
| *F02M 26/54* | (2016.01) | |

(52) U.S. Cl.
CPC ............ *F02M 26/53* (2016.02); *F02M 26/54* (2016.02); *H01F 7/129* (2013.01); *H01F 7/1607* (2013.01); *F01L 2009/043* (2013.01); *F01L 2009/0463* (2013.01); *F01N 2390/02* (2013.01); *Y02T 10/144* (2013.01); *Y02T 10/20* (2013.01)

(56) References Cited

U.S. PATENT DOCUMENTS

2010/0183865 A1* 7/2010 Nagayama ............. B01D 69/02
428/319.7
2012/0318217 A1    12/2012 Herrmann et al.

FOREIGN PATENT DOCUMENTS

| DE | 37 09 474 C1 | 3/1988 |
|---|---|---|
| DE | 42 21 821 A1 | 1/1994 |
| DE | 10 2008 004 531 B3 | 9/2009 |
| DE | 10 2009 058 930 A1 | 6/2011 |
| EP | 1 361 383 A1 | 11/2003 |
| EP | 1 628 313 A2 | 2/2006 |
| JP | 2868617 B2 | 12/1998 |
| JP | 3404265 B2 | 2/2003 |
| KR | 10-2006-0053146 A | 5/2006 |
| WO | WO 91/10854 A1 | 7/1991 |

\* cited by examiner

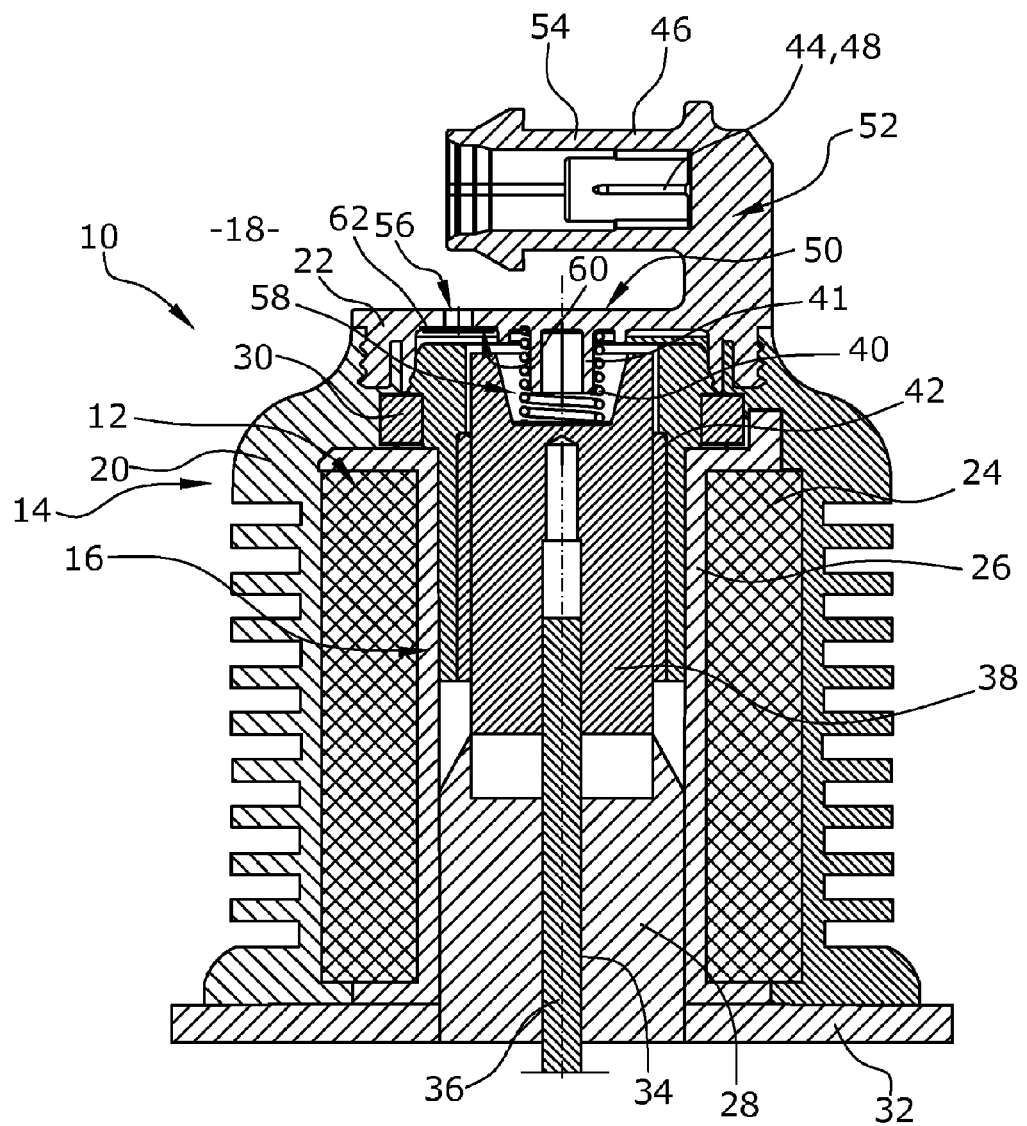

ACTUATOR FOR VALVES IN INTERNAL COMBUSTION ENGINES

CROSS REFERENCE TO PRIOR APPLICATIONS

This application is a U.S. National Phase application under 35 U.S.C. § 371 of International Application No. PCT/EP2014/070008, filed on Sep. 19, 2014 and which claims benefit to German Patent Application No. 10 2013 111 722.8, filed on Oct. 24, 2013. The International Application was published in German on Apr. 30, 2015 as WO 2015/058914 A1 under PCT Article 21(2).

FIELD

The present invention relates to an actuator for valves in an internal combustion engine. The actuator having an electric drive unit, a housing in the interior of which the drive unit is arranged, at least one aeration opening in the housing, and a plug via which the drive unit is adapted to be electrically connected with a voltage source.

BACKGROUND

Such actuators serve to operate exhaust gas return valves to control the amount of exhaust gas returned to the combustion chamber or secondary air valves to control the amount of secondary air introduced into the exhaust gas piping, which are used to reduce pollutants in internal combustion engines. These actuators are frequently operated electromagnetically, but can also be operated by an electric motor.

An electromagnetically operated secondary air valve is described, for example, in DE 10 2009 058 930 A1. This valve controls, via a globe valve whose valve rod is connected with the armature of the electromagnet, an amount of air to be supplied to the exhaust gas pipe and pumped by a secondary air pump by adjusting, via operation of the electromagnet, a flow cross-section between a fluid inlet duct and a fluid outlet duct connected with the exhaust gas pipe. The valve comprises a non-return flap which, when the valve is closed, is pressed against the valve seat to prevent air from flowing back when exhaust gas pulsations occur. However, air pulsations also act upon the interior of the actuator. Pressure differences also occur in the armature space due to the movement of the armature.

Exhaust gas pulsations occurring in exhaust gas return valves act directly upon the interior of the actuator so that malfunctioning must be expected.

To provide aeration of the armature space and at the same time prevent dirt, in particular spray water, from entering the interior of the electromagnet from outside, DE 10 2008 004 531 B3 describes connecting the armature space with the exterior of the valve via a de-aeration bore. A mushroom valve having an elastic edge bears upon and closes the de-aeration bore when the pressure in the armature space is lower than that of the exterior. The valve opens upon reversal of the pressure difference. This means, however, that aeration is not possible if a vacuum occurs in the armature space. Opening and closing noises are also produced by the movement of the mushroom valve.

SUMMARY

An aspect of the present invention is to provide an actuator for valves in internal combustion engines which provide both de-aeration and aeration of the actuator and, in particular, the armature space of electromagnets, and which at the same time reliably protects against penetration of dust particles or spray water into the interior of the actuator. An additional aspect of the present invention is to provide an actuator with a simple and inexpensive manufacture and installation.

In an embodiment, the present invention provides an actuator for a valve in an internal combustion engine which includes a housing, an electric drive unit arranged in an interior of the housing, an aeration opening arranged in the housing, a plug configured to electrically connect the electric drive unit to a voltage source, and a membrane comprising pores. The membrane is configured to close the aeration opening in the housing.

BRIEF DESCRIPTION OF THE DRAWINGS

The present invention is described in greater detail below on the basis of embodiments and of the drawing in which:

FIG. 1 shows a cross-sectional side view of an actuator according to the present invention.

DETAILED DESCRIPTION

Because the aeration opening in the housing is closed by a fine-pored membrane, gas can escape either into the interior or to the exterior depending on the prevailing pressure difference. Penetration of solids or spray water into the interior of the actuator is also prevented by the membrane since the molecules of these substances are larger than the pores of the membrane.

In an embodiment of the present invention, the membrane can, for example, be arranged at a surface of the housing facing the interior. Possible damage to the fastening surface of the membrane is thereby prevented since no outer force application surface exists.

It has turned out to be particularly advantageous when the membrane is a PTFE membrane since the pore size of such a membrane provides aeration and de-aeration and prevents penetration of water and solids. This membrane also has a very long service life.

In an embodiment of the present invention, the membrane can, for example, be welded to the housing. This fastening process provides a high stability of the fastening at low costs.

In an embodiment of the present invention, the edges of the membrane can, for example, be overmolded by the plastic material of the housing.

In an embodiment of the present invention, the aeration opening at the housing can, for example, be formed in the area of the plug which, in such an arrangement, serves as an additional shield against spray water.

In an embodiment of the present invention, the plug can, for example, comprise a portion which extends essentially in parallel to a surface of the housing. The aeration opening is thereby arranged in the housing opposite to the portion of the plug extending in parallel. In this embodiment, the plug serves as a cap or a shielding plate, whereby even less spray water can flow to the aeration bore without an additional component parts being required or the aeration function being restricted.

A particularly simple manufacture of the actuator is realized when the plug extends from a cover portion of the electric drive unit, wherein the housing surrounding the drive unit is injection-molded to the cover portion. The membrane can thus first be fastened and/or welded to the side of the cover facing the interior, whereby good accessibility is offered.

In an embodiment of the present invention, the electric drive unit can, for example, be an electromagnet whose armature is operatively connected with a valve rod. This provides a rapid and reliable operation of the valve at low current consumption as well as a simple connection between the actuator and the valve.

In an embodiment of the present invention, the aeration opening at the housing can, for example, lead into an armature space of the electromagnet so that pressure pulsations produced by displacement of the armature in the interior of the electromagnet can be rapidly and reliably dissipated.

An actuator for valves in internal combustion engines is thus provided via which both the aeration and the de-aeration of the housing of the actuator are provided and which shows a high insensitivity to liquid or solid dirt. This actuator is easy and inexpensive to manufacture and install, has a long service life, and a very good functionality since faults caused by dirt or pressure are avoided.

An exemplary embodiment of the present invention is illustrated in the drawing and is described below.

The actuator 10 shown in FIG. 1 comprises an electric drive unit 12 which is surrounded by a housing 14 that separates an interior 16, where the electric drive unit 12 is arranged, from an exterior 18. The housing 14 comprises a housing portion 20, which essentially radially surrounds the drive unit 12, as well as a cover portion 22, via which the housing 14 is closed at a first axial end.

The electric drive unit 12 is configured as an electromagnet and is composed of a coil 24 wound around a coil carrier 26, a core 28 fastened in the coil carrier 26, a yoke 30, as well as a reflux metal sheet 32 arranged at the end of the housing 14 opposite to the first axial end, which reflux metal sheet 32 closes the first axial end to a large extent and at the same time can serve as a flange surface to fasten a flow housing. The reflux metal sheet 32 surrounds an axial end portion of the core 28 and is of an essentially plate-shaped configuration. The core 28 comprises a central through-going opening 34 through which extends a valve rod 36 of a valve to be operated, which valve rod 36 is connected with a movable armature 38 that, when the coil 24 is energized, is pulled towards the core 28 and loaded towards the core 28 via a spring 40 which radially surrounds a projection 41 defined at the cover portion 22 and which is guided thereby. Another spring (not shown) presses the armature 38, in the non-energized state of the coil 24, from the core 28 into its initial position. The armature 38 is supported in a sliding bushing 42 which is fastened in the interior of the coil carrier 26.

Lead frames 44 are inserted or injection-molded in the housing 14 to supply the coil 24 with current and also to contact any integrated circuit boards, position sensors, and pressure sensors. The lead frames 44 lead to a plug 46 that is defined at the cover portion 22. The contact tabs 48 of the lead frame 44 extend from plug 46, via which the actuator 10 is connected in a conventional manner with a voltage source and/or a motor control unit via continuing lines.

The plug 46 first extends orthogonally away from a surface 50 of the cover portion 22 and comprises a bend 52 in its further course from which it extends orthogonally again so that this portion 54 of the plug 46 extends essentially in parallel to the surface 50 of the cover portion 22.

An aeration opening 56 is defined in the area of the cover portion 22 covered by the portion 54 of the plug 46 via which a connection between the interior 16 and the exterior 18 of the housing 14 is established. An armature space 58 is aerated and de-aerated in this manner in the shown embodiment. A fine-pored membrane 62 which completely covers the aeration bore is welded to the surface 60 facing the armature space 58. In the shown embodiment, this membrane 62 is a PTFE membrane through the pores of which gases can flow to the inside or the outside, but no liquids or solids, such as soot particles, can enter the interior 16. The size of these pores is approximately 0.2 to 1 µm.

During manufacture of the housing 14 of the actuator 10, the cover portion 22 is first injection-molded, and the membrane 62 is then welded to the aeration opening 56 from the inside. The housing portion 20 radially surrounding the electric drive unit 12 is subsequently injection-molded to the cover portion 22. The connecting plane between the membrane 62 and the cover portion 22 is accordingly located in the area of the interior 16 so that an unintentional detachment of the membrane 62 due to the application of a force from outside can be prevented to a large extent.

A negative pressure may be produced in the armature space 58 of the actuator 10 if, due to energizing, the armature 38 is pulled towards the core 28 to open a connected valve. This is prevented by taking in air from the exterior 18 via the aeration opening 56 and the membrane 62. A buildup of a positive pressure in the armature space 58 can likewise be prevented in the case of a reverse movement of the armature 38. Other pressure differences due to pressure pulsations in the lines or simply due to temperature changes can, for example, also be compensated for.

If this actuator 10 is used in a vehicle, it is usually subjected to spray water or solid contaminants. A large amount of these contaminants and of the spray water is shielded off by the plug 46 projecting above the aeration opening 56, which plug serves as a kind of spray water cap. Liquids or solids which nevertheless reach the aeration opening 56 are prevented from entering the interior 16 by the membrane 62 since the pores thereof are too small for these substances to pass through.

An actuator is thus provided which is not subject to any restrictions of functionality due to pressure differences in the interior and which has a long service life since the interior is shielded against contaminants from outside. These functions are realized without any major installation or manufacturing costs being involved. A long service life of the membrane is also provided.

It should be appreciated that various design changes of the actuator are conceivable without departing from the scope of protection of the main claim. Thus, depending on the plastic material used, the membrane 62 may also be injection-molded for fastening purposes, during the manufacture of the cover. Various electric drive units 12, such as electric motors, can also be used. Other advantageous materials can also be used for the membrane 62. The plug 46 can further have a straight configuration or can be defined at the radially delimiting housing portion 20. Reference should also be had to the appended claims.

What is claimed is:

1. An actuator for a valve in an internal combustion engine, the actuator comprising:
   an electric drive unit;
   a housing configured to separate an interior in which the electric drive unit is arranged from an exterior;
   an aeration opening arranged in the housing, the aeration opening connecting the interior and the exterior;
   a plug configured to electrically connect the electric drive unit to a voltage source; and a membrane comprising pores, the membrane being configured to close the aeration opening in the housing so that a gas can flow either from the exterior into the interior or from the interior to the exterior.

2. The actuator as recited in claim 1, wherein,
the housing comprises a surface facing the interior, and
the membrane is arranged at the surface.

3. The actuator as recited in claim 1, wherein the membrane is a PTFE membrane.

4. The actuator as recited in claim 1, wherein the membrane is welded to the housing.

5. The actuator as recited in claim 1, wherein,
the housing comprises a plastic,
the membrane comprises edges, and
the edges of the membrane are overmolded by the plastic of the housing.

6. The actuator as recited in claim 1, wherein the aeration opening at the housing is arranged in an area of the plug.

7. The actuator as recited in claim 1, wherein,
the housing comprises an outer surface,
the plug comprises a plug portion which extends substantially in parallel to the outer surface of the housing, and
the aeration opening in the housing is arranged opposite to the plug portion extending in parallel.

8. The actuator as recited in claim 1, wherein,
the housing comprises a cover portion;
the plug is configured to extend from the cover portion of the housing, and
the housing radially surrounds the electric drive unit and is injection-molded to the cover portion.

9. The actuator as recited in claim 1, further comprising:
a valve rod,
wherein, the electric drive unit is an electromagnet comprising an armature which is operatively connected with the valve rod.

10. The actuator as recited in claim 9, wherein,
the electromagnet comprises an armature space, and
the aeration opening at the housing leads into the armature space.

11. An actuator for a valve in an internal combustion engine, the actuator comprising:
an electric drive unit comprising an armature and an armature space;
a housing configured to separate an interior in which the electric drive unit is arranged from an exterior;
an aeration opening arranged in the housing, the aeration opening directly connecting the armature space in the interior and the exterior;
a plug configured to electrically connect the electric drive unit to a voltage source; and
a membrane comprising pores, the membrane being configured to close the aeration opening in the housing so that a gas can flow either from the exterior into the armature space in the interior or from the armature space in the interior to the exterior.

12. The actuator as recited in claim 11, wherein,
the housing comprises a surface facing the interior, and
the membrane is arranged at the surface.

13. The actuator as recited in claim 11, wherein the membrane is a PTFE membrane.

14. The actuator as recited in claim 11, wherein the membrane is welded to the housing.

15. The actuator as recited in claim 11, wherein,
the housing comprises a plastic,
the membrane comprises edges, and
the edges of the membrane are overmolded by the plastic of the housing.

16. The actuator as recited in claim 11, wherein the aeration opening at the housing is arranged in an area of the plug.

17. The actuator as recited in claim 11, wherein,
the housing comprises an outer surface,
the plug comprises a plug portion which extends substantially in parallel to the outer surface of the housing, and
the aeration opening in the housing is arranged opposite to the plug portion extending in parallel.

18. The actuator as recited in claim 11, wherein,
the housing comprises a cover portion;
the plug is configured to extend from the cover portion of the housing, and
the housing radially surrounds the electric drive unit and is injection-molded to the cover portion.

19. The actuator as recited in claim 11, further comprising:
a valve rod,
wherein,
the electric drive unit is an electromagnet, and
the armature is operatively connected with the valve rod.

* * * * *